United States Patent [19]

Pedrazzi

[11] Patent Number: 4,876,342
[45] Date of Patent: Oct. 24, 1989

[54] OXAZINE COMPOUNDS SUBSTITUTED BY ONE OR MORE BASIC GROUPS AND PREPARATION THEREOF

[75] Inventor: Reinhard Pedrazzi, Allschwil, Switzerland

[73] Assignee: Sandoz Ltd., Basel, Switzerland

[21] Appl. No.: 199,211

[22] Filed: May 26, 1988

Related U.S. Application Data

[63] Continuation of Ser. No. 41,893, Apr. 23, 1987, abandoned, which is a continuation-in-part of Ser. No. 791,190, Oct. 25, 1985, abandoned.

[30] Foreign Application Priority Data

Oct. 25, 1984 [DE] Fed. Rep. of Germany ....... 3449095
Jun. 7, 1985 [DE] Fed. Rep. of Germany ....... 3520399

[51] Int. Cl.$^4$ ................... C07D 498/22; C09B 19/00
[52] U.S. Cl. .......................... 544/14; 544/74; 544/75; 544/76
[58] Field of Search ................. 544/14, 74, 75, 76

[56] References Cited

U.S. PATENT DOCUMENTS 4,336,377 6/1982 Adam et al. ................. 544/74
4,395,545 7/1983 Adam et al. ................. 544/74

FOREIGN PATENT DOCUMENTS 15233 9/1980 European Pat. Off. .

Primary Examiner—Richard L. Raymond
Attorney, Agent, or Firm—Gerald D. Sharkin; Richard E. Vila; Thomas C. Doyle

[57] ABSTRACT

Oxazine compounds containing basic groups correspond to the formula

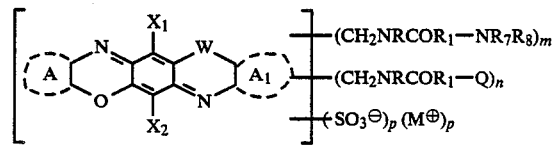

wherein the symbols are as defined in the Specification.

These compounds are suitable for dyeing or printing organic substrates containing hydroxy groups or nitrogen in accordance with known methods. Preferred substrates are textile materials which consist of or contain natural or regenerated cellulose, e.g. cotton, but also bast fibres or leather. Most preferred substrates are paper or paper products. Furthermore, these compounds can be used to prepare all kinds of inks, such as ball-pen inks or printing inks.

Similarly, a mixture of one or more of the above compounds together with one or more copper phthalocyanine dyes containing basic and/or cationic groups can be used as dyeing or printing agent.

21 Claims, No Drawings

OXAZINE COMPOUNDS SUBSTITUTED BY ONE OR MORE BASIC GROUPS AND PREPARATION THEREOF

This is continuation of application Ser. No. 041,893, filed Apr. 23, 1987, now abandoned which in turn is a continuation-in-part of application Ser. No. 791,190, filed Oct. 25, 1985, now abandoned.

The invention relates to oxazine compounds containing basic groups which compounds are suitable for use as dyestuffs.

According to the invention there is provided a compound of formula I,

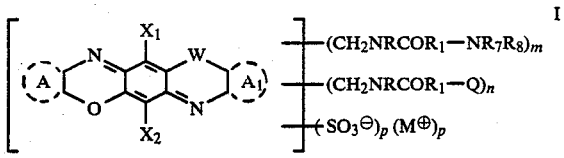

in which

W is O or S, each of $X_1$ and $X_2$ is independently hydrogen, halogen, cyano, $C_{1-4}$alkyl, $C_{1-4}$alkoxy, phenyl or phenylamino, which phenyl ring of the latter two groups is unsubstituted or substituted by one to three groups selected from halogen, $C_{1-4}$alkyl and $C_{1-4}$alkoxy; —NHCOR$_9$, —CONR$_{10}$R$_{11}$, —COOR$_{12}$ or —OCOR$_{13}$, $R_9$ is $C_{1-4}$alkyl, phenyl or phenyl substituted by one or two groups selected from halogen, $C_{1-4}$alkyl and $C_{1-4}$alkoxy, $R_{10}$ is hydrogen, $C_{1-4}$alkyl, cyclohexyl, phenyl-$C_{1-4}$alkyl, unsubstituted phenyl or phenyl monosubstituted by chlorine, methyl or methoxy, $R_{11}$ is hydrogen, $C_{1-4}$alkyl, cyclohexyl, phenyl or phenyl-$C_{1-4}$alkyl, $R_{12}$ is hydrogen, $C_{1-4}$alkyl or cyclohexyl, $R_{13}$ is $C_{1-4}$alkyl or cyclohexyl, each of the rings A and $A_1$, independently, signifies a fused ring system containing one to four 4- to 8-membered carbocyclic and/or heterocyclic rings which may be further substituted, each R is independently hydrogen or $C_{1-4}$alkyl, each $R_1$ is independently $C_{1-6}$alkylene or $C_{2-6}$alkenylene, each Q is independently halogen, —NR$_2$R$_3$ or $\oplus$-NR$_4$R$_5$R$_6$An$^\ominus$, An$^\ominus$ is a non-chromophoric anion, M$^\oplus$ is hydrogen or a non-chromophoric cation, each of m an n is independently a number of from 1 to 4, with the proviso that $2 \leq m+n \leq 6$, is a number of from 0 to 1, $R_2$ is $C_{1-12}$alkyl, —Alk—Y in which —Alk— is a $C_{2-6}$alkylene group which may be interrupted by —O— or —NR— and which may be further substituted by OH or —NRR, and Y is OH or —NR$_2'$R$_3'$; unsubstituted $C_{5-8}$cycloalkyl or $C_{5-8}$cycloalkyl substituted by one to three $C_{1-4}$alkyl groups; phenyl or phenyl-$C_{1-4}$alkyl in which each phenyl ring is unsubstituted or substituted by one to three groups selected from halogen, $C_{1-4}$alkyl and $C_{1-4}$alkoxy, $R_3$ is hydrogen, $C_{1-12}$alkyl, $C_{2-4}$alkyl monosubstituted by hydroxy, unsubstituted $C_{5-8}$cycloalkyl or $C_{5-8}$cycloalkyl substituted by one to three $C_{1-4}$alkyl groups, $R_4$ has one of the significances of $R_2$, $R_5$ has one of the significances of $R_3$ except hydrogen, and $R_6$ is NH$_2$, $C_{1-12}$alkyl, $C_{2-4}$alkyl monosubstituted by hydroxy, or is phenyl-$C_{1-4}$alkyl, or $R_2$ and $R_3$ or $R_4$ and $R_5$, together with the N-atom to which they are attached, form a 5- or 6-membered saturated or unsaturated ring which contains one to three hetero atoms and is further unsubstituted or substituted by one to three groups selected from $C_{1-4}$alkyl and $C_{2-4}$alkyl monosubstituted by hydroxy or amino, or $R_4$, $R_5$ and $R_6$, together with the N-atom to which they are attached, form a pyridinium group which is unsubstituted or substituted by one or two $C_{1-4}$alkyl groups, each of $R_7$ and $R_8$ is independently $C_{1-12}$alkyl, $C_{2-4}$alkyl monosubstituted by hydroxy, or $C_{5-8}$cycloalkyl which is unsubstituted or substituted by one to three $C_{1-4}$alkyl groups, or $R_7$ and $R_8$, together with the N-atom to which they are attached, form a 5- or 6-membered saturated or unsaturated ring which contains one to three hetero atoms and is further unsubstituted or substituted by one to three groups selected from $C_{1-4}$alkyl or $C_{2-4}$alkyl monosubstituted by hydroxy or amino, $R_2'$ is hydrogen or has one of the non-cyclic or cyclic significances of $R_2$ except —Alk—Y—, and $R_3'$ has one of the non-cyclic or cyclic significances of $R_3$, with the proviso that in a compound of formula I Q is different from —NR$_7$R$_8$.

In the specification any halogen means fluorine, chlorine or bromine, more preferably chlorine or bromine, especially chlorine.

Any alkyl, alkylene or alkenylene present is linear or branched unless indicated to the contrary.

In any hydroxy substituted alkyl group which is linked to a nitrogen atom the hydroxy group is bound to a carbon atom other than to the $C_1$-atom.

W is preferably O.

Any alkyl as $X_1$ or $X_2$ is preferably methyl or ethyl, especially methyl. Any alkoxy is preferably methoxy or ethoxy, especially methoxy. Any substituted phenyl group is preferably substituted by one or two groups selected from chlorine, methyl and methoxy.

$R_9$ is preferably $R_{9a}$, where $R_{9a}$ is methyl, phenyl or phenyl monosubstituted by chlorine, methyl or methoxy.

$R_{10}$ is preferably $R_{10a}$, where $R_{10a}$ is hydrogen, phenyl or phenyl monosubstituted by chlorine, methyl or methoxy.

$R_{11}$ is preferably hydrogen.

$R_{12}$ is preferably $R_{12a}$, where $R_{12a}$ is hydrogen, methyl or ethyl.

$R_{13}$ is preferably $R_{13a}$, where $R_{13a}$ is methyl or ethyl.

Each of $X_1$ and $X_2$ is preferably $X_{1a}$ and $X_{2a}$, where each of $X_{1a}$ and $X_{2a}$ is independently hydrogen, chlorine, bromine, cyano, methyl, ethyl, methoxy, ethoxy, phenylamino, the phenyl group of which is unsubstituted or substituted by one or two groups selected from chlorine, methyl and methoxy; —NHCOR$_{9a}$, —CONHR$_{10a}$, —COOR$_{12a}$ or —OCOR$_{13a}$. More preferably, each of $X_1$ and $X_2$ is $X_{1b}$ and $X_{2b}$, where each of $X_{1b}$ and $X_{2b}$ is independently hydrogen, chlorine, bromine, methyl, ethyl —NHCOR$_{9a}$, —CONH$_2$ or —COOR$_{12a}$. Most preferably $X_1$ and $X_2$ are chlorine.

Furthermore, it is preferred that $X_1$ and $X_2$ are identical groups.

The fused ring systems A and $A_1$ bearing the basic and anionic groups outside the brackets may be the same or different, preferably they are identical. A and $A_1$ may contain carbocyclic and/or heterocyclic fused rings which are saturated, unsaturated or aromatic and which are further unsubstituted or may contain further substituents. For example, A and $A_1$ signify the following aromatic carbocyclic or mixed carbocyclic/heterocyclic ring systems (a) to (o) listed below in which each position α denotes the carbon atom attached to oxygen and W, respectively, and each position β denotes the carbon atom attached to nitrogen:

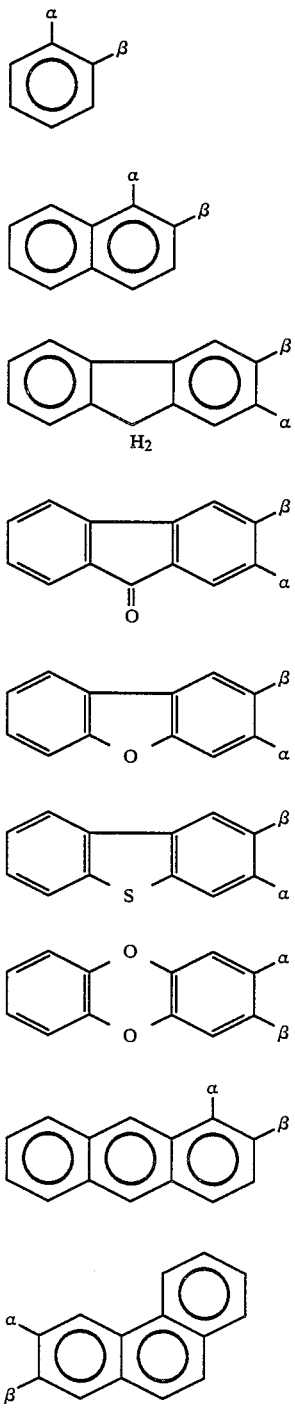

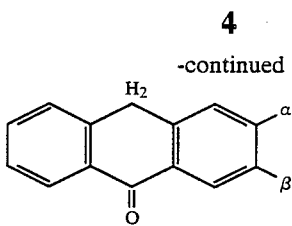

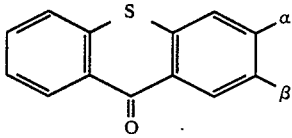

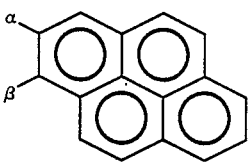

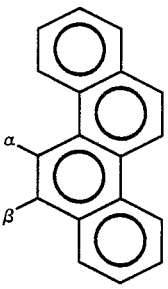

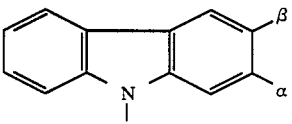

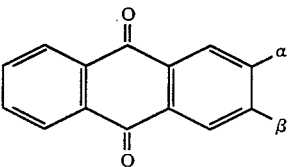

In the ring system (n) $R_{14}$ is hydrogen, $C_{1-4}$alkyl or —$COC_{1-4}$alkyl.

The aromatic rings of these groups (a) to (o) may contain further substituents, for example those groups selected from halogen, $C_{1-4}$alkyl, $C_{1-4}$alkoxy, $NO_2$, CN, SCN, OH, SH, COOH, -$C_{1-4}$alkylene—NRR, —O—phenyl or —NR—phenyl, the phenyl group of which is unsubstituted or substituted by one to three groups selected from halogen, $C_{1-4}$alkyl, $C_{1-4}$alkoxy and -$C_{1-4}$alkylene—NRR;

—$SO_2NR_{2x}R_3$, —$NR_{2x}R_3$ and

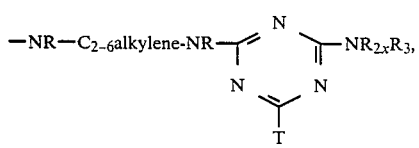

wherein T is halogen or —NR$_{2x}$R$_3$ and R$_{2x}$ is hydrogen or has one of the significances of R$_2$.

More preferred as substituents are those groups selected from chlorine, C$_{1-4}$alkyl, C$_{1-4}$alkoxy, COOH, -C$_{1-2}$alkylene—NHR; —O—phenyl or —NH—phenyl, the phenyl group of which is unsubstituted or substituted by one to three methyl groups or by a group -C$_{1-2}$alkylene—NHR; —SO$_2$NHR$_{2x}'$, —NHR$_{2x}'$ and

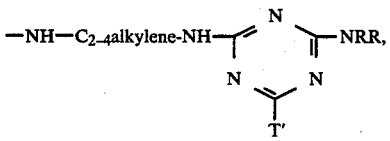

wherein T' is chlorine or —NRR and R$_{2x}'$ is hydrogen, C$_{1-2}$alkyl, —CH$_2$CH$_2$OH or —(CH$_2$)$_{2-3}$NRR.

R$_{14}$ is preferably R$_{14a}$, where R$_{14a}$ is hydrogen, methyl, ethyl or —COCH$_3$.

Each R is preferably R$_a$, where each R$_a$ is independently hydrogen, methyl or ethyl. Most preferably R is hydrogen.

Each R$_1$ is preferably R$_{1a}$, where each R$_{1a}$ is independently C$_{1-4}$alkylene or C$_{2-3}$alkenylene. More preferably it is R$_{1b}$, where each R$_{1b}$ is independently —CH$_2$—, —CH$_2$CH$_2$— or

Most preferably each R$_1$ is methylene.

Any unsubstituted alkyl as R$_7$ or R$_8$ is preferably C$_{1-6}$alkyl, more preferably C$_{1-4}$alkyl. Any cycloalkyl is preferably cyclohexyl which is unsubstituted or substituted by up to three methyl groups. Where R$_7$ and R$_8$ together with the N-atom to which they are attached form a heterocyclic ring, this is preferably a 6-membered ring; more preferably it is a piperidine, morpholine or piperazine ring, in which the N-atom of the latter ring is unsubstituted or substituted by methyl, hydroxyethyl or aminoethyl. Most preferably it is a piperidine or morpholine ring.

Each of R$_7$ and R$_8$ is preferably R$_{7a}$ and R$_{8a}$, where each of R$_{7a}$ and R$_{8a}$ is independently C$_{1-6}$alkyl, hydroxyethyl or cyclohexyl which is unsubstituted or substituted by up to three methyl groups, or R$_{7a}$ and R$_{8a}$ together with the N-atom to which they are attached form a piperidine, morpholine or piperazine ring, in which the N-atom of the latter ring is unsubstituted or substituted by methyl, hydroxyethyl or aminoethyl. More preferably, each of R$_7$ and R$_8$ is R$_{7b}$ and R$_{8b}$, where each of R$_{7b}$ and R$_{8b}$ is independently C$_{1-4}$alkyl or cyclohexyl or R$_{7b}$ and R$_{8b}$ together with the N-atom to which they are attached form a piperidine or morpholine ring. Most preferably, R$_7$ is R$_{7c}$, where R$_{7c}$ is methyl or (n)butyl and R$_8$ is R$_{8c}$, where R$_{8c}$ is (n)butyl or cyclohexyl or R$_{7c}$ and R$_{8c}$ together with the N-atom to which they are attached form a piperidine or morpholine ring.

Any unsubstituted alkyl present as a group R$_2$ to R$_6$ is preferably C$_{1-6}$alkyl, more preferably C$_{1-4}$alkyl. Any cycloalkyl is a group R$_2$ to R$_5$ is preferably cyclohexyl which is unsubstituted or substituted by up to three methyl groups. Any phenylalkyl as R$_2$ or R$_6$ is preferably phenyl-C$_{1-2}$alkyl, in which the phenyl ring is unsubstituted or substituted by one or two groups selected from chlorine, methyl and methoxy.

Any —Alk—Y as R$_2$ is preferably —Alk'—Y', in which —Alk'— is a C$_{2-4}$alkylene group and Y' is OH or —NR$_{2b}'$R$_{3b}'$ (as defined below).

R$_2$ is preferably R$_{2a}$, where R$_{2a}$ is C$_{1-6}$alkyl, -C$_{2-4}$alkylene—Y', in which Y' is OH or —NR$_{2b}'$R$_{3b}'$ (as defined below), cyclohexyl unsubstituted or substituted by one to three methyl groups; phenyl or phenyl-C$_{1-2}$alkyl, in which the phenyl ring of the latter two groups is unsubstituted or substituted by one or two groups selected from chlorine, methyl and methoxy;

R$_3$ is preferably R$_{3a}$, where R$_{3a}$ is hydrogen, C$_{1-6}$alkyl, hydroxyethyl or cyclohexyl;

or R$_{2a}$ and R$_{3a}$ together with the N-atom to which they are attached form a pyrrolidine, piperidine, morpholine or piperazine ring, which rings are further unsubstituted or may be substituted by one to three groups selected from methyl, hydroxyethyl and aminoethyl.

More preferably, R$_2$ is R$_{2b}$, where R$_{2b}$ is C$_{1-4}$alkyl, -C$_{2-3}$alkylene—Y'', in which Y'' is OH or —NRR; cyclohexyl or phenyl-C$_{1-2}$alkyl;

more preferably, R$_3$ is R$_{3b}$, where R$_{3b}$ is hydrogen, C$_{1-4}$alkyl or cyclohexyl;

or R$_{2b}$ and R$_{3b}$ together with the N-atom to which they are attached form a piperidine, morpholine or piperazine ring, in which the N-atom of the latter ring is unsubstituted or substituted by methyl, hydroxyethyl or aminoethyl.

A group R$_{2b}'$ is hydrogen or has one of the non-cyclic or cyclic significances of R$_{2b}$ except -C$_{2-3}$alkylene—Y'''; R$_{3b}'$ has one of the non-cyclic or cyclic significances of R$_{3b}$.

R$_4$ is preferably R$_{4a}$, where R$_{4a}$ has one of the non-cyclic or cyclic significances of R$_{2a}$;

R$_5$ is preferably R$_{5a}$, where R$_{5a}$ has one of the non-cyclic or cyclic significances of R$_{3a}$ except hydrogen;

R$_6$ is preferably R$_{6a}$, where R$_{6a}$ is NH$_2$, C$_{1-4}$alkyl, hydroxyethyl or phenyl-C$_{1-2}$alkyl;

or R$_{4a}$, R$_{5a}$ and R$_{6a}$ together with the N-atom to which they are attached form a pyridinium group which is further unsubstituted or substituted by one or two methyl groups.

More preferably, R$_4$ is R$_{4b}$, where R$_{4b}$ has one of the non-cyclic or cyclic significances of R$_{2b}$;

more preferably, R$_5$ is R$_{5b}$, where R$_{5b}$ has one of the non-cyclic or cyclic significances of R$_{3b}$ except hydrogen;

more preferably, R$_6$ is R$_{6b}$, where R$_{6b}$ is C$_{1-2}$alkyl or benzyl;

or R$_{4b}$, R$_{5b}$ and R$_{6b}$ together with the N-atom to which they are attached from a pyridinium, picolinium or lutidinium group, especially an unsubstituted pyridinium group.

Q in n groups —CH$_2$NRCOR$_1$—Q may be the same or different; when different, Q is preferably (chlorine)$_x$ with (n-x)groups —NR$_2$R$_3$ or $\oplus$—NR$_4$R$_5$R$_6$An$^\ominus$ present at the same time.

Each Q is preferably Q$_a$, where each Q$_a$ is independently chlorine, —NR$_{2a}$R$_{3a}$ or $\oplus$—NR$_{4a}$R$_{5a}$R$_{6a}$An$^\ominus$; more preferably each Q is Q$_b$, where each Q$_b$ is chlorine, —NR$_{2b}$R$_{3b}$ or $\oplus$—NR$_{4b}$R$_{5b}$R$_{6b}$An$^\ominus$ and the n groups Q$_b$ are identical.

Preferably, p is p', where p' is a number of from 0 to 0.5.

Preferred compounds correspond to formula Ia,

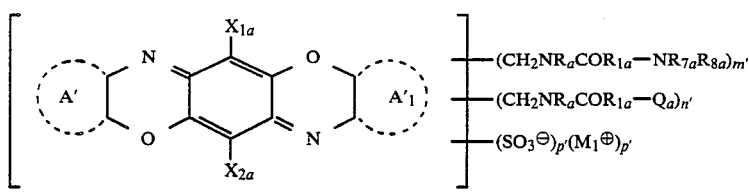

in which each of the rings A' and A₁' is independently a fused ring system (a) to (o), in which any aromatic ring is further unsubstituted or may contain those substituents as described hereinbefore which substituents may be the same or different, each of m' and n' is independently a number of from 1 to 3, provided that $$2 \leq m' + n' \leq 4,$$

and $M_1^{\oplus}$ is hydrogen, sodium, potassium, lithium, ammonium or substituted ammonium, with the proviso that in a compound of formula Ia $Q_a$ is different from $-NR_{7a}R_{8a}$.

More preferred are compounds which correspond to formula Ib,

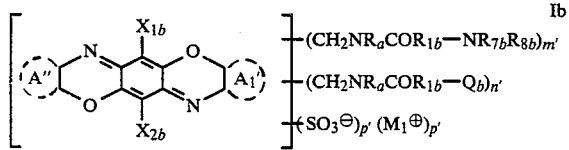

in which m' and n' are as defined above, each of the rings A'' and A₁'' is independently a fused ring system (a) to (f) or (n), in which any aromatic ring is further unsubstituted or may contain those preferred substituents as described hereinbefore which may be the same or different, with the proviso that in a compound of formula Ib $Q_b$ is different from $-NR_{7b}R_{8b}$.

Even more preferred are compounds of formula Ib, in which each of the rings A'' and A₁'' is independently a further unsubstituted or substituted fused ring system (a) or (n), and each $X_{1b}$ and $X_{2b}$ is chlorine.

Most preferred are compounds which correspond to formula Ic,

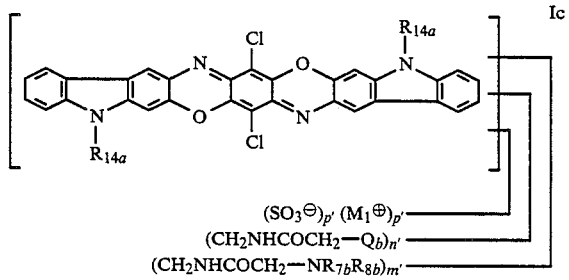

in which m' and n' are as defined above, with the proviso that in a compound of formula Ic $Q_b$ is different from $-NR_{7b}R_{8b}$.

Even more preferably, in a compound of formula Ic $R_{7b}$ is $R_{7c}$ and $R_{8b}$ is $R_{8c}$ and the n' groups $Q_b$ are identical.

The present invention further provides a process for the preparation of compounds of formula I comprising reacting per mol of a compound of formula II,

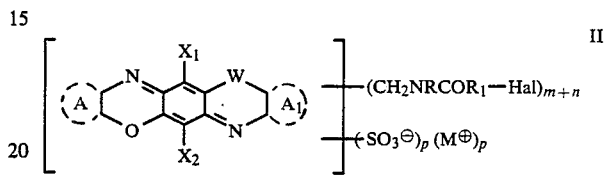

in which A, A₁, W, X₁, X₂, R, R₁, M, m, n and p are as defined above, and Hal is halogen, m mols of a compound of formula III,

in which R₇ and R₈ are as defined above, and optionally n or n₁ mols of a compound of formula IV or V

in which $R_2$ to $R_6$ are as defined above, and $n_1$ is less than n, provided that when n mols of a compound of formula IV are employed, a compound of formula III and a compound of formula IV are different from each other, whereby in a step (a) m=1 mol of a compound of formula III is reacted at a maximum temperature of 40° C. and in an alkaline pH range below 11;

and, if necessary, in a subsequent step (b) m−1 mols of a compound of formula III and optionally n or n₁ mols of a compound of formula IV or V are reacted in an alkaline pH range of approximately pH 11 and in a temperature range of from 45°–80° C.

The reaction with m=1 mol of a compound of formula III according to step (a) advantageously takes place in water at a temperature of between 20° and 40° C., preferably 32°–40° C., and preferably at a pH of 9.5–10.7, more preferably at a pH of 10.4–10.7. The alkaline pH range is maintained by the presence of any alkaline-reacting agent, preferably by the addition of an alkali metal hydroxide or alkali metal carbonate.

The reaction with m−1 mols of a compound of formula III and n or n₁ mols of a compound of formula IV or V according to step (b) advantageously is carried out in water and in the same solution as for step (a), at a temperature of from 45°–80° C., preferably 48°–60° C., and preferably at a pH of 10.7–11.2. The alkaline pH range necessary for the reaction is attained by the presence of any alkaline-reacting agent, especially an alkali metal hydroxide such as sodium or potassium hydroxide.

The compounds of formula I can be isolated from the alkaline aqueous suspension in accordance with conventional methods.

The anions An⁻ may be any non-chromophoric inorganic or organic anions such as those conventional in basic dyestuff chemistry. Suitable anions include chloride, bromide, sulphate, bisulphate, methyl sulphate, amino sulphate, perchlorate, benzene sulphonate, oxalate, maleinate, acetate, propionate, lactate, succinate, carbonate, bicarbonate, phosphate, naphthalene sulphonate, chloroacetate and tartrate as well as complex anions, for example zinc chloride double salts, and furthermore the anions of the following acids: Citric acid, glycolic acid, methoxyglycolic acid, adipic acid, malic acid or addition products of ortho boric acid with polyalcohols and cis-polyols, respectively.

The starting compounds of formula II are either known or may be obtained by known processes from available starting materials.

Dioxazine compounds containing basic groups similar to the compounds of formula I are already known, for example from two European Patent Publications Nos. 14,678 and 15,232. The compounds disclosed therein are prepared by reacting an appropriate pigment with N-methylolchloracetamide and subsequent amination, for example with pyridine. This amination process is carried out using a large excess pyridine in the absence of water (simultaneously, pyridine is used as reaction component and solvent). By this method, it is impossible to carry out successive aminations with different amines in the same molecule, or to obtain compounds still having chloromethyl groups beside aminated groups.

It has therefore surprising and unforseeable that in the same molecule a stepwise amination process could be carried out when using for the first amination step 1 mol of a secondary aliphatic or cycloaliphatic amine. Since this stepwise reaction requires the use of an equimolar amount of such an amine for the first step (in order to have a controlled quantitative 1:1 reaction), it is necessary to use a solvent, advantageously water.

Under these reaction conditions, the use of a tertiary amine does not show any notable reaction, i.e. mainly unreacted insoluble pigment is obtained. If a primary amine is employed instead of a tertiary, evidently a reaction takes place. However, the resulting products show very low solubility and do not differ substantially from the insoluble starting pigment.

Contrary to that if one mol of a pigment substituted by 2 to 6 M-methylolchloroacetamido groups is reacted with one mole of a secondary amine, preferably in water, a quantitative reaction takes place (measurable by the use up of alkali) and a product is obtained which is completely soluble in dilute acid. The other chloromethyl groups present may remain unchanged or, if desired, subsequently may be reacted completely or partially with a primary, secondary or tertiary amine in a second step.

The compounds of formula I according to the invention are suitable for dyeing, pad-dyeing or printing organic substrates which contain hydroxy groups or nitrogen in accordance with known methods. They can be used as dyes directly after the conventional isolation, but they can also be used as dyeing preparations, particularly in form of aqueous liquid concentrated, stable dyestuff preparations in which the dyestuff is present in quaternary salt form and/or in acid addition salt form of mineral acis or organic acids, or in partially internal salt form.

The compounds of formula I may be converted into dyeing preparations in accordance with known methods. Processing into stable liquid, preferably aqueous, or solid dyeing preparations may take place in a generally known manner, advantageously, suitable liquid preparations may be made by dissolving the dyestuff in suitable solvents such as mineral acids or organic acids e.g, hydrochloric acid, sulphuric acid, phosphoric acid, formic acid, acetic acid, lactic acid, glycolic acid, citric acid and methane sulphonic acid; furthermore formamide, dimethylformamide, urea, glycol, diglycol, diglycol ether and glycerin; which may be used together with water, optionally adding an assistant e.g., a stabiliser. Such preparations may be obtained, for example, as described in French patent specification No. 1,572,030.

Advantageously, solid dyeing preparations may be made by grinding or, preferably, granulating for example, in accordance with the method described in French patent specification No. 1,581,900.

The oxazine compounds according to the invention (in the corresponding salt form) are preferably used for dyeing or printing textile material which consists of or contains natural or regenerated cellulose, such as cotton, but also for bast fibres or leather; preferred substrates are paper and paper products. Dyeing and printing of these substrates are carried out in accordance with known methods.

Owing to their high substantivity the new dyestuffs and dyeing preparations thereof show surprisingly good properties with respect to waste water and wet fastnesses. When producing sized or unsized paper the waste water is essentially colourless which is important with respect to environmental pollution. The dyeings on paper have good wet fastness properties. they do not show any bleeding and are fast to milk, alcohol, soap and sodium chloride solution, fruit juices, sweetened mineral water and urine. Furthermore, the dyed papers exhibit very good light fastness properties.

The compounds according to the invention are also suitable for dyeing, pad-dyeing or printing anionically modified polyamide or polyester textiles.

Furthermore, the oxazine compounds of formula I may be used for the preparation of all kinds of inks, such as ball-pen inks or printing inks.

The compounds of formula I are not only suitable as single dyes, they are also suitable for dyeing in combination with other dyes. They can be used both as ready mixtures, or the components of those mixtures can be added to the substrate separately. Suitable dyes for a mixture are substantive dyes which preferably contain cationic or basic groups. Particularly preferred for such mixtures are copper phthalocyanine dyes having cationic and/or basic groups, which optionally contain sulphonic acid groups. These mixtures yield brilliant blue shades of high purity. Suitable copper phthalocyanine dyes are described, for example, in British patent specifications Nos. 2,104,538 and 1,185,791; in European patent publication No. 114,325; furthermore, in U.S. patent specification Nos. 3,784,599; 4,393,005; 4,448,722 and 4,521,217.

The compounds of formula I are insensitive to pH variations both as a mixture or as a single dye, i.e. over a pH range of 4 to 10 the dyeings made with a single dye or a mixture remain constant in shade and depth of colour. Furthermore, the dyestuffs are insensitive to electrolytes, for example, to sulphate, chloride or similar ions, i.e. in the presence of such ions there is no loss in dye yield.

The following examples further serve to illustrate the invention. In the examples, all parts and percentages are by weight or volume, and the temperatures given are in degrees Centigrade, unless indicated to the contrary.

EXAMPLE 1

43.4 Parts (0.05 mols) of a mixture consisting of 1 part of a bis(chloroacetamidomethyl)substituted dioxazine compound and 2 parts of a tris(chloroacetamidomethyl)substituted dioxazine compound corresponding to the formula

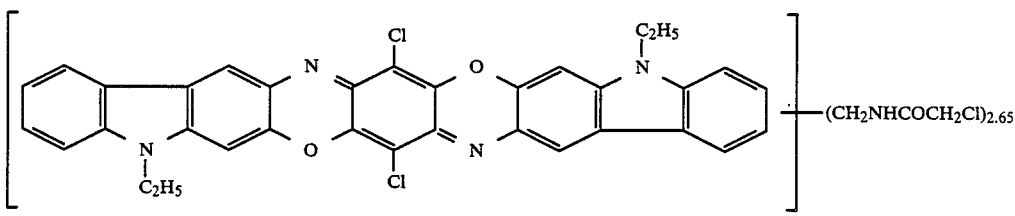

are stirred into 360 parts of water. The pH of the resultant suspension is adjusted to 7-7.5 by the addition of a few drops of 30% sodium hydroxide solution. 4.3 Parts (0.05 mols) of piperdine are then added, the pH thus increases to 12. The suspension is heated to 38° and the pH is kept at 10.5-10.7 by adding dropwise 8 parts of 30% sodium hydroxide solution. After about two hours, the reaction is complete and the pH remains constant. The suspension is filtered off and the residue is washed with water until it is free from salt. The filtrate thus remains colourless.

The dyestuff obtained corresponds to the formula,

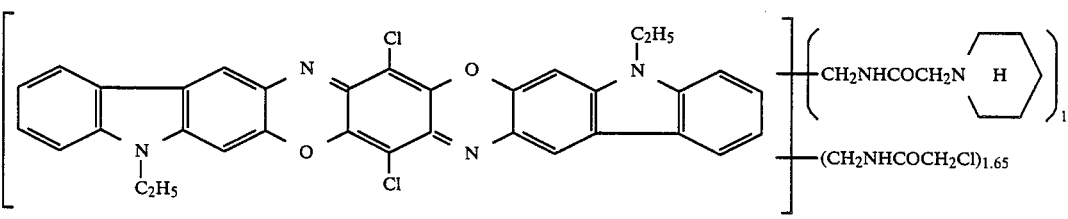

it is completely soluble in dilute acetic acid.

Analysis: $C_{47}H_{42.6}N_{7.65}Cl_{3.65}O_{4.65}$; calculated: C 61.36% H 4.65% N 11.66% Cl 14.11%; found: C 59.6% H 4.7% N 11.6% Cl 13.9%.

The dyestuff in acid addition salt form dyes paper a brillant violet-blue shades. The waste water is colourless. The paper dyeings have very good light and wet fastness properties.

EXAMPLE 2

The procedure is as given in Example 1, but prior to filtration 16.7 parts (0.13 mols) of di-(n)butylamine are added to the reaction mixture. The pH increases to 11.1. The mixture is heated to 48° and the pH is kept at 10.7-11 by dropwise addition of 30% sodium hydroxide solution. After five to eight hours, the reaction is complete. The thus obtained dyestuff suspension is filtered off with suction, washed with water until it is free from salt and dried. The dyestuff thus obtained corresponds to the formula

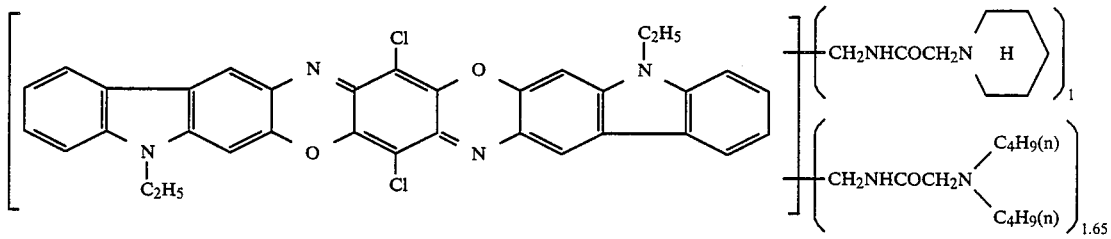

which in acid addition salt from dyes paper a brilliant blue shade. The waste water is colourless. The paper dyeings have very good light and wet fastness properties.

Analysis: $C_{60}H_{72.3}N_{9.3}O_{4.65}Cl_2$; calculated: C 67.46% H 6.76% N 12.18% Cl 6.64%; found: C 65.1% H 6.5% N 12.1% Cl 7.4%.

EXAMPLES 3 TO 45

By a method analogous to that of Examples 1 and 2 further compounds of formula I can be prepared using other amines instead of piperidine and di-(n)butylamine, respectively. They correspond to formula (1)

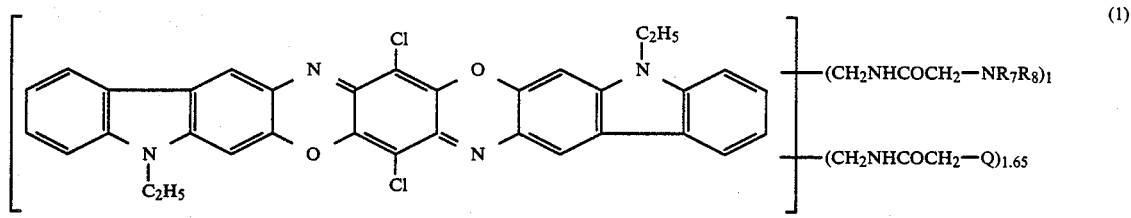

in which the symbols are defined in Table 1 below. The dyestuffs listed (in acid addition salt form) dye paper a brillant blue shade. These paper dyeings have very good light and wet fastness properties, the waste water is practically colourless.

Any $An^\ominus$ in Table 1 is the anion of the reaction medium.

TABLE 1

| Ex. No. | compounds of formula (1) −NR₇R₈ | −Q |
|---|---|---|
| 3 | −N(piperidine)H | −N(C₂H₅)₂ |
| 4 | " | −NHCH₂−C₆H₅ |
| 5 | " | −N(morpholine) |
| 6 | " | −N(cyclohexyl)CH₃ |
| 7 | " | −N(cyclohexyl)C₂H₅ |
| 8 | " | −N(CH₃)(CH₂CH₂OH) |
| 9 | " | −N(piperazine)N−CH₂CH₂OH |
| 10 | " | −N⁺(CH₃)₃  An⁻ |
| 11 | " | −⁺N(pyridine)  An⁻ |
| 12 | −N(morpholine) | Cl |

TABLE 1-continued

| Ex. No. | compounds of formula (1) −NR₇R₈ | −Q |
|---|---|---|
| 13 | " | −N(C₄H₉(n))₂ |
| 14 | " | −N(piperidine)H |
| 15 | " | −N(cyclohexyl with CH₃)H |
| 16 | " | −⁺N(morpholine)NH₂  An⁻ |
| 17 | " | −N(CH₃)(CH₂CH₂OH) |
| 18 | −N(morpholine) | −N(piperazine)N−CH₂CH₂NH₂ |
| 19 | " | −N(cyclohexyl)₂ |
| 20 | " | −⁺N(CH₃)₂(CH₂)₃NH₂  An⁻ |
| 21 | " | −NH−C₆H₅ |
| 22 | " | −⁺N(pyridine with CH₃)  An⁻ |

TABLE 1-continued compounds of formula (1)

| Ex. No. | —NR₇R₈ | —Q |
|---|---|---|
| 23 | —N(CH₃)(H)(cyclohexyl) | Cl |
| 24 | " | —N(morpholine)O |
| 25 | " | —NH(piperidine) |
| 26 | " | —N(CH₃)(CH₂CH₂OH) |
| 27 | " | —NHCH₂—(phenyl) |
| 28 | " | —⊕N(pyridine) Anθ |
| 29 | " | —N(C₂H₅)₂ |
| 30 | " | —N(C₂H₅)(H)(cyclohexyl) |
| 31 | " | —⊕N(CH₃)₃ Anθ |
| 32 | —N(CH₃)(H)(cyclohexyl) | —N(piperazine)N—CH₂CH₂OH |
| 33 | —N(C₄H₉(n))₂ | Cl |
| 34 | " | —NH(piperidine) |
| 35 | " | —N(morpholine)O |
| 36 | " | —N(CH₃)(H)(cyclohexyl) |
| 37 | " | —⊕N(pyridine) Anθ |
| 38 | " | —⊕N(CH₃)₃ Anθ |
| 39 | " | —⊕N(CH₃)₂(NH₂) Anθ |
| 40 | " | —NHCH₂—(phenyl) |
| 41 | " | —NH—(cyclohexyl)H |
| 42 | " | —⊕N(C₂H₅)₂(CH₂CH₂OH) Anθ |
| 43 | " | —N(pyrrolidine)H |
| 44 | " | —N(cyclohexyl)₂H |
| 45 | " | —⊕N(CH₃)₂((CH₂)₃NH₂) Anθ |

EXAMPLE 46

When, instead of the mixture of dioxazine compounds used in Example 1, 41 parts of a mixture consisting of 1 part of a bis(chloroacetamidomethyl)substituted dioxazine compound and 2 parts of a tris(chloroacetamidomethyl)substituted dioxazine compound corresponding to the formula

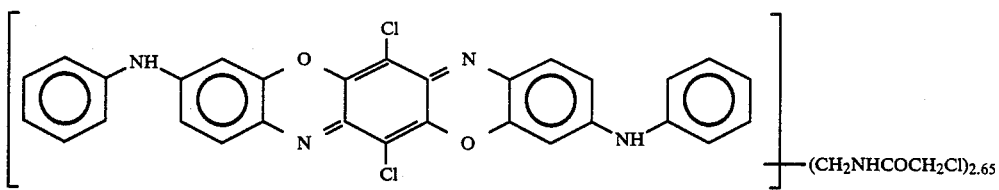

are employed according to the method described in Examples 1 and 2, the dyestuff having the formula

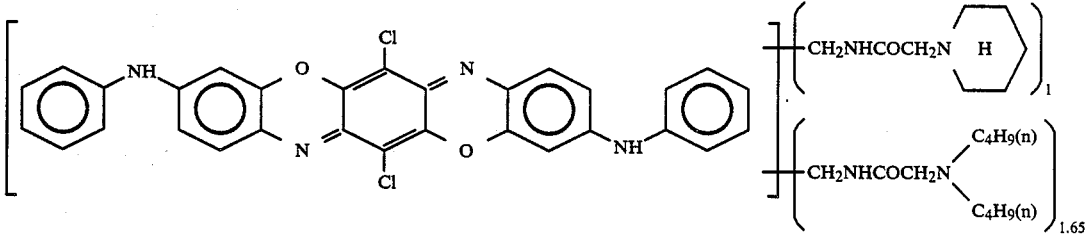

is obtained which in acid addition salt form dyes paper a brilliant reddish-blue shade. These paper dyeings have notably good light and wet fastness properties.

EXAMPLE 47

In a similar manner as described in Example 46 but using 42 parts of a mixture consisting of 1 part of a bis(chloroacetamidomethyl)substituted dioxazine compound and 2 parts of a tris(chloroacetamidomethyl)substituted dioxazine compound corresponding to the formula, is obtained. This dyestuff, in acid addition salt form, dyes paper a red shade. The obtained paper dyeings show good general fastness properties.

By a method analogous to that of Examples 1 and 2 further compounds of formula I can be prepared using appropriate chloroacetamidomethylsubstituted oxazine compounds as starting material and appropriate amines to replace the chlorine.

EXAMPLES 48 TO 91

For Table 2, the compounds correspond to formula (2)

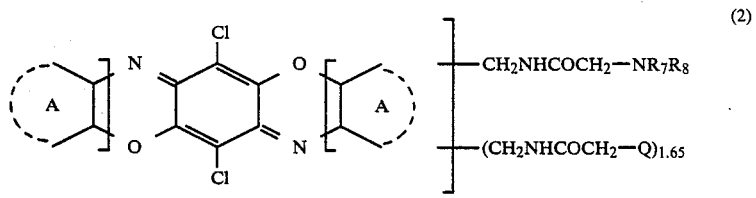

in which the symbols are as defined in Table 2 below.

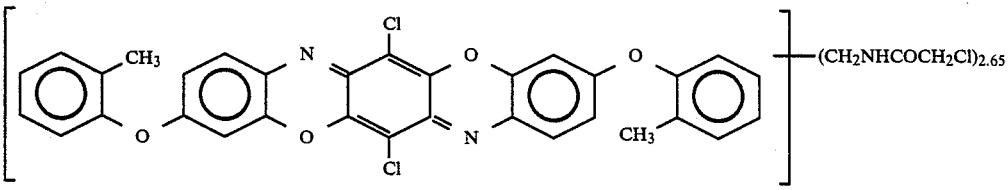

the dyestuff having the formula

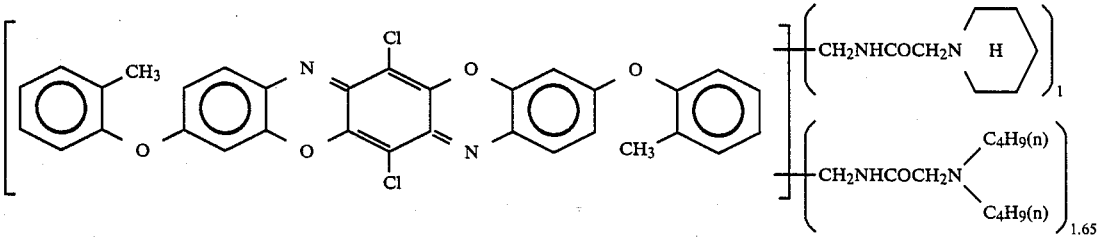

EXAMPLES 92 TO 105

For Table 3, the compounds correspond to formula (3)

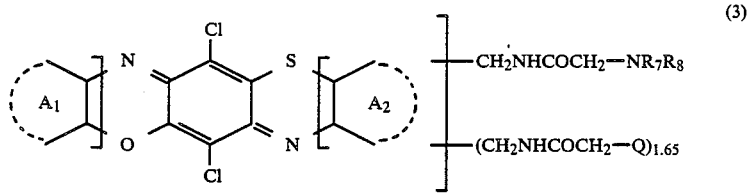

in which the symbols are as defined in Table 3 below.

For the sake of simplicity, different combinations $K_1$ to $K_9$ are used in Tables 2 and 3 for the $m=1$ groups $-NR_7R_8$ and $n=1.65$ groups Q present as listed below:

| Combination | $-NR_7R_8$ | $(-Q)_{1.65}$ |
|---|---|---|
| $K_1$ | —N(piperidine)H | Cl |
| $K_2$ | " | —N(C₄H₉(n))₂ |
| $K_3$ | " | —N(CH₃)(cyclohexyl)H |
| $K_4$ | —N(morpholine) | Cl |
| $K_5$ | " | —N(C₄H₉(n))₂ |
| $K_6$ | " | —NHCH₂—Ph |
| $K_7$ | —N(C₄H₉(n))₂ | —NH—Ph |
| $K_8$ | —N(CH₃)(cyclohexyl)H | —N(morpholine) |
| $K_9$ | " | —N(CH₃)₃⁺ An⁻ |

(An⊖ is the anion of the reaction medium)

In the last column of each of Tables 2 and 3 the shade of the paper dyeing is given.

TABLE 2

| Ex. No. | compounds of formula (2) A | combination | shade on paper |
|---|---|---|---|
| 48 | fluorene-type (CH₂ bridge) | $K_1$ | violet |
| 49 | " | $K_2$ | " |
| 50 | " | $K_3$ | " |
| 51 | dibenzofuran-type (O bridge) | $K_4$ | reddish-violet |
| 52 | " | $K_5$ | " |
| 53 | " | $K_6$ | " |
| 54 | dibenzodioxin-type | $K_7$ | bluish-violet |
| 55 | " | $K_8$ | " |

TABLE 2-continued
| Ex. No. | compounds of formula (2) A | combination | shade on paper |
|---|---|---|---|
| 56 | 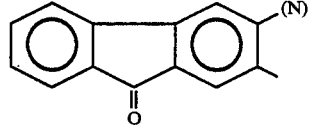 | K₁ | " |
| 57 | " | K₃ | " |
| 58 | 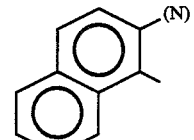 | K₄ | reddish-blue |
| 59 | " | K₆ | " |
| 60 | 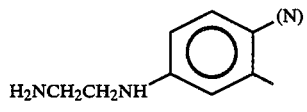 | K₈ | blue |
| 61 | " | K₉ | " |
| 62 | 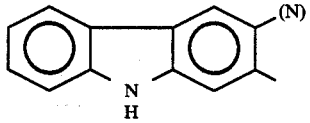 | K₁ | reddish-blue |
| 63 | " | K₂ | " |
| 64 | " | K₃ | " |
| 65 | 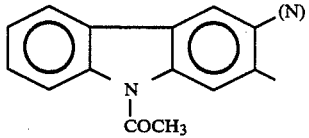 | K₃ | bluish-violet |
| 66 | " | K₅ | " |
| 67 | 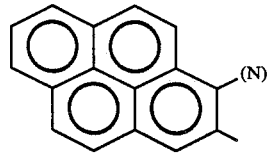 | K₂ | blue |
| 68 | 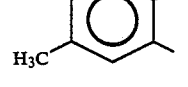 | K₁ | red |
| 69 | " | K₂ | " |
| 70 | " | K₃ | " |
| 71 | " | K₄ | " |
| 72 | " | K₅ | " |
| 73 | " | K₇ | " |
| 74 | 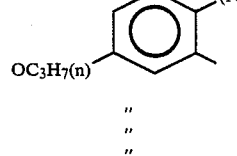 | K₂ | ruby |
| 75 | " | K₅ | " |
| 76 | " | K₇ | " |
| 77 | " | K₈ | " |

TABLE 2-continued
| Ex. No. | compounds of formula (2) A | combination | shade on paper |
|---|---|---|---|
| 78 | 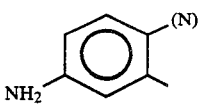 | $K_1$ | violet |
| 79 | " | $K_2$ | " |
| 80 | " | $K_4$ | " |
| 81 | " | $K_5$ | " |
| 82 | " | $K_8$ | " |
| 83 | 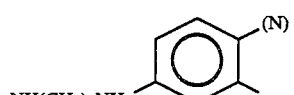 | $K_7$ | blue |
| 84 | " | $K_8$ | " |
| 85 | 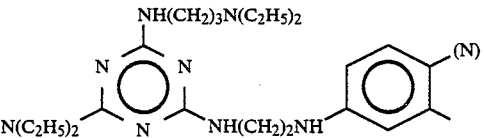 | $K_2$ | " |
| 86 | " | $K_5$ | " |
| 87 | 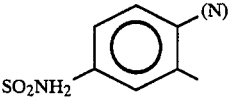 | $K_4$ | reddish-blue |
| 88 | " | $K_6$ | " |
| 89 | 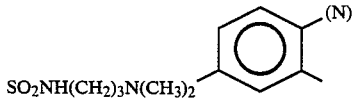 | $K_4$ | " |
| 90 | " | $K_5$ | " |
| 91 | " | $K_9$ | " |
TABLE 3
| Ex. No. | compounds of formula (3) $A_1$ | $A_2$ | combination | shade on paper |
|---|---|---|---|---|
| 92 | 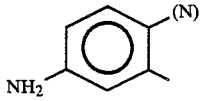 | 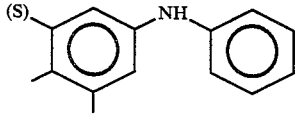 | $K_1$ | blue |
| 93 | " | " | $K_2$ | " |
| 94 | " | 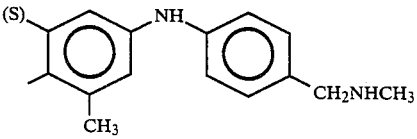 | $K_3$ | " |
| 95 | " | " | $K_5$ | " |

TABLE 3-continued

| Ex. No. | A₁ | A₂ | combination | shade on paper |
|---|---|---|---|---|
| 96 | " | (S)-4-methyl-3-methyl-phenyl-NH-2,4,6-trimethylphenyl | K₂ | " |
| 97 | " | " | K₈ | " |
| 98 | " | (S)-4-methyl-phenyl-NH-phenyl | K₄ | " |
| 99 | 4-amino-2-methyl-aniline (N) | (S)-4-methyl-phenyl-NH-phenyl | K₅ | blue |
| 100 | " | (S)-4-methyl-phenyl-NH-3,5-dimethylphenyl | K₃ | " |
| 101 | " | " | K₈ | " |
| 102 | 2-amino-4-(N)-methyl-aniline | (S)-4-methyl-phenyl-OCH₃ | K₂ | violet |
| 103 | " | " | K₆ | " |
| 104 | " | (S)-4-methyl-3-methyl-phenyl-NH-phenyl | K₇ | " |
| 105 | " | " | K₉ | " |

EXAMPLES 106 TO 108

By a method analogous to that of Examples 1 and 2 further compounds of formula I can be prepared using appropriate starting compounds. They correspond to the formula

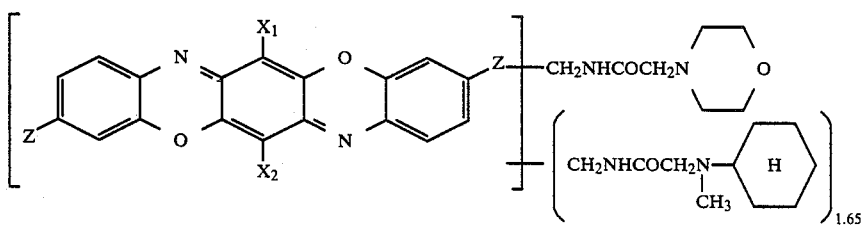

in which for Example 106: each of $X_1$ and $X_2$ is hydrogen and each Z is $-OCH_3$;

for Example 107: each of $X_1$ and $X_2$ is bromine and each Z is 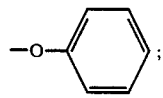

for Example 108: each of $X_1$ and $X_2$ is

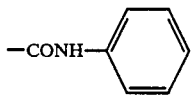

and each Z is

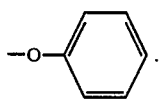

The dyestuffs of Example 106 to 108 dye paper a red shade.

Analysis: $C_{46}H_{38}Cl_6N_8O_6$; calculated: C 54.62% H 3.79% Cl 21.03% N 11.08% O 9.49%; found: C 53.6% H 3.8% Cl 21.1% N 10.9%.

100 Parts (0.031 mols) of the wet press cake prepared above are stirred into 200 parts of water and 4 parts of N-methylcyclohexylamine (0,035 mols) are added. The pH increases to 11.7. The mixture is heated to 40° whereby the amination commences whilst the pH decreases. The pH is kept at 10.6 exactly by adding 1N sodium hydroxide solution. After 15 hours the reaction is complete. 36 Parts by volume of 1N sodium hydroxide solution have been used up. The dyestuff thus obtained is filtered off and washed with water until it is free from salt. 104 Parts of a wet press cake are obtained containing 34 parts of a dyestuff having the formula

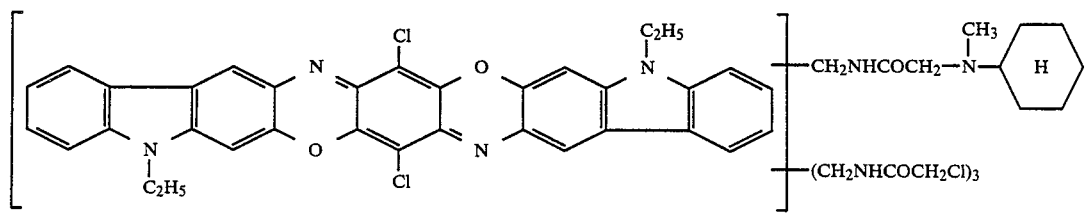

EXAMPLE 109

500 Parts of sulphuric acid monohydrate are mixed with 55 parts of ice. To this mixture which has been cooled to 0°–5° by further external cooling, 59 parts of a compound having the formula

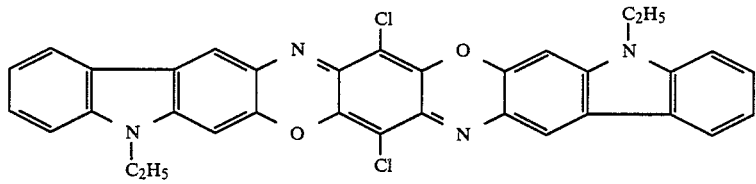

and 66.7 parts of N-methylolchloroacetamide are added. Stirring is effected for 19 hours at room temperature. The reaction mixture is then poured onto ice whereby the reaction product precipitates. It is filtered off and washed with water to a neutral pH. 317 parts of a wet press cake are obtained containing 106 parts of a compound having the formula This dyestuff is completely soluble in dilute acetic acid.

Analysis: $C_{53}H_{52}Cl_5N_9O_6$; calculated: C 58.49% H 4.82% Cl 16.29% N 11.58% O 8.82%; found: C 57.3% H 4.8% Cl 16.4% N 11.7% O 9.7%.

The dyestuff, in acid addition salt form, dyes paper a brilliant violet-blue shade. The waste water is colourless.

EXAMPLE 110

The dyestuff as prepared according to the method described in Example 109 is stirred into 200 parts of water. To this mixture 17 parts of morpholine are added. Stirring is effected for 15 to 20 hours at pH 11 and at a temperature of 60°–70°, whereby further amination takes place. After conventional isolation, the dyestuff having the formula

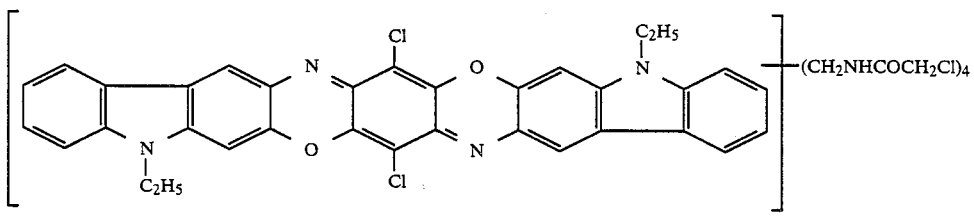

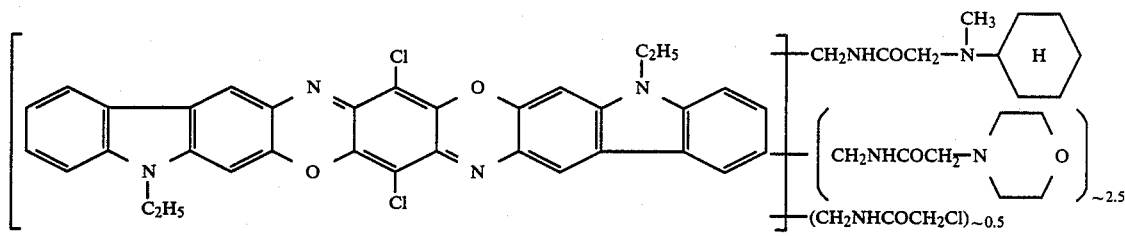

is obtained. If dyes paper (in acid addition salt form) a brilliant violet-blue shade.

EXAMPLE 111

By a method analogous to that described in Example 109 but using, instead of N-methylcyclohexylamine, 3 parts of morpholine a dyestuff having the formula

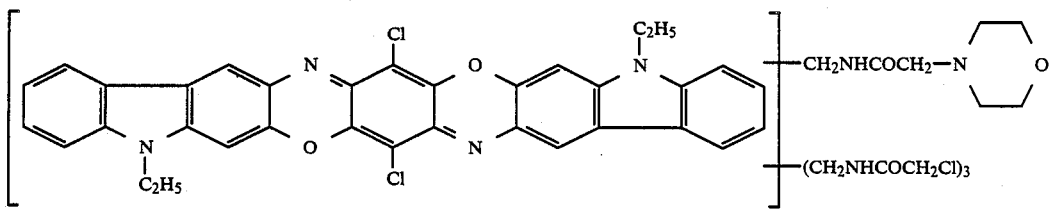

is obtained which is completely soluble in dilute acetic acid.

Analysis: $C_{50}H_{46}Cl_5N_9O_7$; calculated: C 56.54% H 4.36% Cl 16.69% N 11.87% O 10.54%; found: C 55.7% H 4.2% Cl 16.4% N 11.7% O 11.7%.

EXAMPLE 112

When, in a second step, the dyestuff of Example 111 is again reacted with 3 parts of morpholine following the procedure as described in Example 110 (stirring for some hours at pH 11 and 50°–60°), a dyestuff having the formula

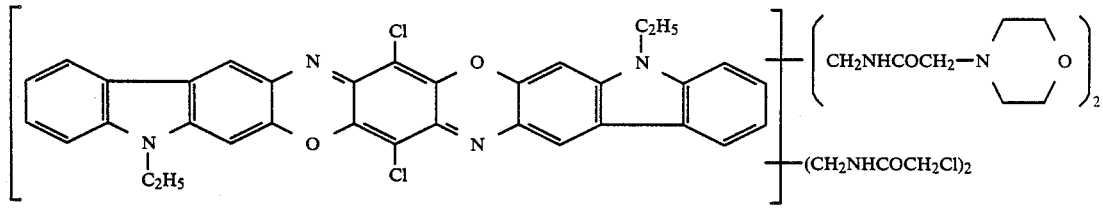

is obtained which is completely soluble in dilute acetic acid.

The dyestuff of Example 111 and 112, in acid addition salt form, dye paper a blue shade. The thus obtained paper dyeings have notably good light and wet fastness properties.

EXAMPLE 113

2 Parts of a dyestuff solution from 8 parts of the dyestuff of Example 2, dissolved in water and acetic acid, and 1 part of a dyestuff solution obtained from 14 parts of a known copper phthalocyanine dyestuff having the formula,

$Cu-Pc-[SO_2NH(CH_2)_3N(CH_3)_2]_{q=2.5-3.5,\ preferably\ 3.1}$ dissolved in water and acetic acid, are mixed together.

If this mixture is employed according to the method given in Application Example A as set forth below, paper dyeings are obtained having a brilliant neutral-blue to greenish-blue shade. These paper dyeings show perfect light and wet fastness properties.

Instead of the dyestuff of Example 2, each dyestuff of the other examples can also be used as a component in these mixtures except those dyestuffs which dye paper a red shade. Such dyestuff mixtures dye paper a brilliant blue shade, the dyeings obtained have good fastness properties.

EXAMPLES 114 TO 122

If instead of the phthalocyanine dyestuff component used in Example 113, the following copper phthalocyanine dyestuffs (114) to (122) which are similarly known from literature (see the corresponding references given in the description), or mixtures thereof, are employed, brilliant blue paper dyeings are obtained having very good fastness properties.

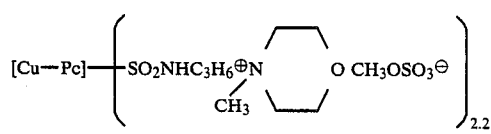

(114)

-continued

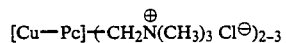 (115)

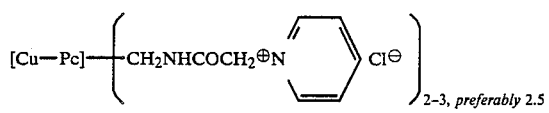 (116)

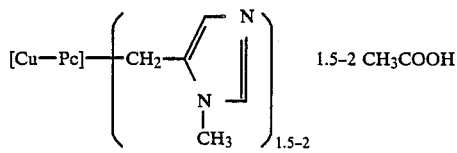 (117)

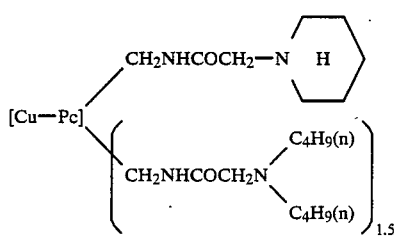 (118)

[Cu—Pc]—(SO₂NHC₂H₄NHC₂H₄NH₂)₂₋₃, preferably 2.5 (119)

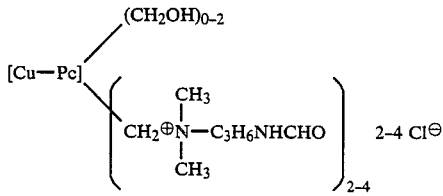 (120)

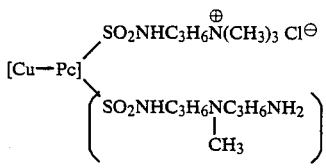 (121)

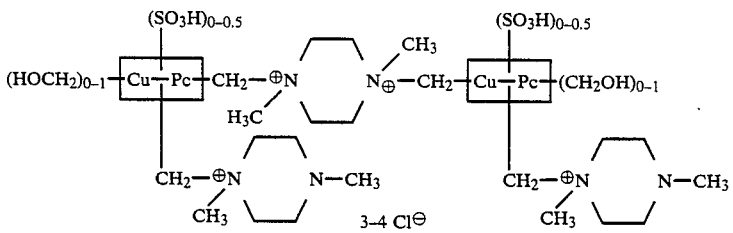 (122)

In the following examples the application of the compounds of this invention is illustrated.

Application Example A

70 Parts of chemically bleached sulphite cellulose obtained from pinewood and 30 parts by chemically bleached sulphite cellulose obtained from birchwood are ground in 2000 parts of water in a Hollander. 0.2 Parts of the dyestuff according to Example 1 or 2 (in acid addition salt form) are sprinkled into this pulp, or 3 parts of the solution of the dyestuff mixture obtained according to the method described in Example 113 are added. After mixing for 20 minutes, paper is produced from this pulp. The absorbent paper which is obtained in this manner is dyed a violet-blue and blue shade, respectively. The waste water is practically colourless.

Application Example B 0.5 Parts of the dyestuff according to Example 1 or 2 (in acid addition salt form) are dissolved in 100 parts of hot water and cooled to room temperature. This solution is added to 100 parts of chemically bleached sulphite cellulose which have been ground in a Hollander with 2000 parts of water. Sizing takes place after thorough mixing for 15 minutes. The paper which is produced from this material has a violet-blue and blue shade, respectively. The paper dyeings have good light and wet fastness properties.

Application Example C

An absorbent length of unsized paper is drawn at 40°–50° through a dyestuff solution having the following composition:

0.5 parts of the dyestuff according to Example 1 or 2 (in acid addition salt form),
0.5 parts of starch and
99.0 parts of water.

The excess dyestuff solution is squeezed out through two rollers. The dried length of paper is dyed in a violet-blue and blue shade, respectively, and has good fastness properties.

In a similar manner as described in Application Examples A to C dyeing may also be effected using an equivalent amount of a liquid dyeing preparation made from the dyestuff according to Example 1 or 2.

Application Example D 50 parts of chemically bleached sulphite cellulose obtained from pinewood and 50 parts chemically bleached sulphite cellulose obtained from beechwood are ground in 2000 parts of water in a Hollander up to a degree of grinding of 20° SR (degrees SchopperRiegler). Then, 2.5 parts of an 8% solution of the dyestuff of Example 2, dissolved in water and lactic acid, and 4 parts of a 10% solution of the dyestuff described in Example 23 of British Patent Specification No. 2,104,538, dissolved in water and lactic acid, are mixed together and added to the paper pulp. The pulp is stirred for 5 minutes and is then diluted with 2000 parts of water. Sheets of paper are produced in the usual manner by drawing the pulp through a sheet former. A sheet of paper in a brilliant blue shade is obtained. The bleeding fastness of the paper dyeing is perfect, and the waste water is colourless.

Application Example E

15 Parts of the dyestuff of Example 2 are stirred into 20 parts of acetic acid, 20 parts of sulphamic acid, 10 parts of N-methylpyrrolidone and 30 parts of water. 5 Parts of tannin are subsequently added, and the mixture is homogenised.

200 Parts of water of 10° hardness are added to 100 parts of the dyestuff obtained as a liquid preparation. This printing ink is used to make test prints on bleached cellulose, consisting of 70% pine sulphate cellulose and 30% birch sulphite cellulose. The thus obtained prints have a blue shade.

Application Example F

100 Parts of freshly tanned and neutralized chrome leather are agitated for 30 minutes in a vessel with a liquor consisting of 250 parts of water at 55° and 0.5 parts of the dyestuff of Example 2, in acid addition salt form, and then treated in the same bath for 30 minutes with 2 parts of an anionic fatty licker based on sulphonated train oil. The leather is then dried and prepared in the normal way, giving a leather evenly dyed in a blue shade.

Application Example G

2 Parts of the dyestuff of Example 2, in acid addition salt form, are dissolved in 4000 parts of demineralized water at 40°. 100 Parts of a pre-wetted cotton textile substrate are added, and the bath is raised to boiling point over 30 minutes and held at the boil for one hour. Any water which evaporates during dyeing is replaced continuously. After rinsing and drying, a blue dyeing is obtained having good light and wet fastness properties. The dye exhausts practically totally, and the waste water is almost colourless.

What is claimed is:

1. A compound of formula I,

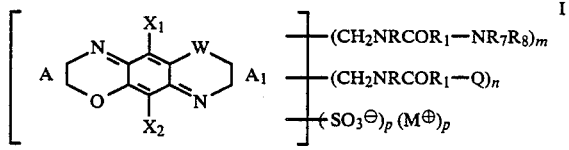

and acid addition salts thereof, in which

W is O or S, each of $X_1$ and $X_2$ is independently hydrogen, halogen, cyano, $C_{1-4}$alkyl, $C_{1-4}$alkoxy, phenyl or phenylamino, which phenyl ring of the latter two groups is unsubstituted or substituted by one to three groups selected from halogen, $C_{1-4}$alkyl and $C_{1-4}$alkoxy; —NHCOR$_9$, —CONR$_{10}$R$_{11}$, —COOR$_{12}$ or —OCOR$_{13}$, $R_9$ is $C_{1-4}$alkyl, phenyl or phenyl substituted by one or two groups selected from halogen, $C_{1-4}$alkyl and $C_{1-4}$alkoxy, $R_{10}$ is hydrogen, $C_{1-4}$alkyl, cyclohexyl, phenyl-$C_{1-4}$-alkyl, unsubstituted phenyl or phenyl monosubstituted by chlorine, methyl or methoxy, $R_{11}$ is hydrogen, $C_{1-4}$alkyl, cyclohexyl, phenyl or phenyl-$C_{1-4}$alkyl, $R_{12}$ is hydrogen, $C_{1-4}$alkyl or cyclohexyl, $R_{13}$ is $C_{1-4}$alkyl or cyclohexyl, each of the rings A and $A_1$, independently, signifies a fused ring system containing one to four 4- to 8-membered carbocyclic and/or heterocyclic rings which may be further substituted, each R is independently hydrogen or $C_{1-4}$alkyl, each $R_1$ is independently $C_{1-6}$alkylene or $C_{2-6}$alkenylene, each Q is independently halogen, —NR$_2$R$_3$ or $\oplus$—NR$_4$R$_5$R$_6$ An$^\ominus$, An$^\ominus$ is a non-chromophoric anion, M$^\oplus$ is hydrogen or a non-chromophoric cation, each of m and n is independently a number of from 1 to 4, with the proviso that $2 \leq m+n \leq 6$, p is a number of from 0 to 1, $R_2$ is $C_{1-12}$alkyl, —Alk—Y in which —Alk— is a $C_{2-6}$alkylene group which may be interrupted by —O— or —NR— and which may be further substituted by OH or —NRR, and Y is OH or —NR$_2$'R$_3$'; unsubstituted $C_{5-8}$cycloalkyl or $C_{5-8}$cycloalkyl substituted by one to three $C_{1-4}$alkyl groups; phenyl or phenyl-$C_{1-4}$alkyl in which each phenyl ring is unsubstituted or substituted by one to three groups selected from halogen, $C_{1-4}$alkyl and $C_{1-4}$alkoxy, $R_3$ is hydrogen, $C_{1-12}$alkyl, $C_{2-4}$alkyl monosubstituted by hydroxy, unsubstituted $C_{5-8}$cycloalkyl or $C_{5-8}$cycloalkyl substituted by one to three $C_{1-4}$alkyl groups, $R_4$ has one of the significances of $R_2$, $R_5$ has one of the significances of $R_3$ except hydrogen, and $R_6$ is NH$_2$, $C_{1-12}$alkyl, $C_{2-4}$alkyl monosubstituted by hydroxy, or is phenyl-$C_{1-4}$alkyl, or R2 and R3 or R4 and R5, together with the N-atom to which they are attached, form a 5- or 6-membered saturated or unsaturated ring which contains one to three hetero atoms and is further unsubstituted or substituted by one to three groups selected from C1–4alkyl and C2–4alkyl monosubstituted by hydroxy or amino, or R4, R5 and R6, together with the N-atom to which they are attached, form a pyridinium group which is unsubstituted or substituted by one or two C1–4alkyl groups, each of R7 and R8 is independently C1–12alkyl, C2–4alkyl monosubstituted by hydroxy, or C5–8cycloalkyl which is unsubstituted or substituted by one to three C1–4alkyl groups, or R7 and R8, together with the N-atom to which they are attached, form a 5- or 6-membered saturated or unsaturated ring which contains one to three hetero atoms and is further unsubstituted or substituted by one to three groups selected from C1–4alkyl or C2–4alkyl monosubstituted by hydroxy or amino, R2' is hydrogen or has one of the non-cyclic or cyclic significances of R2 except —Alk—Y, and R3' has one of the non-cyclic or cyclic significances of R3;

with the proviso that in a compound of formula I Q is different from —NR7R8.

2. A compound according to claim 1, in which W is oxygen.

3. A compound according to claim 1, in which each of X1 and X2 is X1b and X2b, where each of X1b and X2b is independently hydrogen, chlorine, bromine, methyl, ethyl, —NHCOR9a, —CONH2 or —COOR12a, R9a is methyl, phenyl or phenyl monosubstituted by chlorine, methyl or methoxy, and R12a is hydrogen, methyl or ethyl.

4. A compound according to claim 1, in which each of X1 and X2 is chlorine.

5. A compound according to claim 1, in which each of the ring systems A and A1 is independently one of the following aromatic carbocyclic or mixed carbocyclic/heterocyclic ring systems (a) to (o) listed below in which each position α denotes the carbon atom attached to oxygen and W, respectively, and each position β denotes the carbon atom attached to nitrogen:

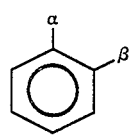
(a)

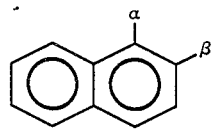
(b)

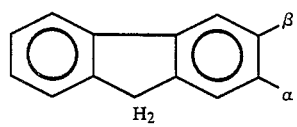
(c)

-continued

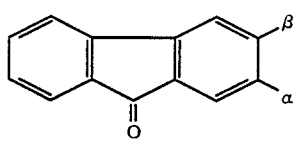
(d)

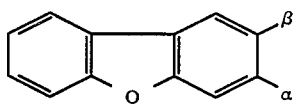
(e)

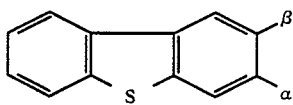
(f)

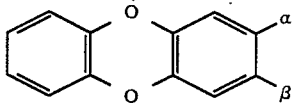
(g)

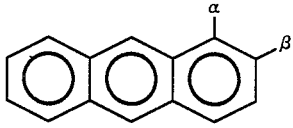
(h)

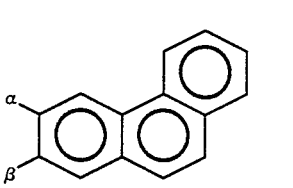
(i)

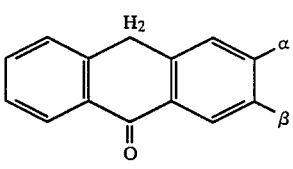
(j)

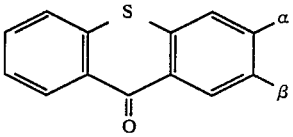
(k)

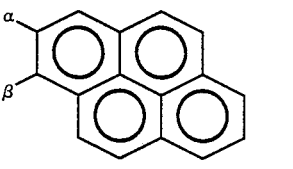
(l)

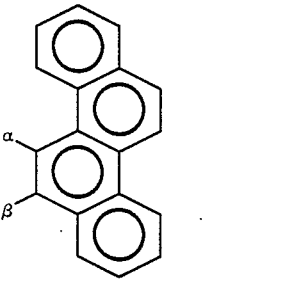
(m)

-continued

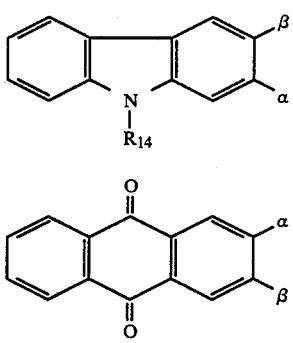
(n)

(o)

in which R$_{14}$ is hydrogen, C$_{1-4}$alkyl or —COC$_{1-4}$alkyl, which groups (a) to (o) are further unsubstituted or may contain further substituents in the aromatic rings which are groups selected from chlorine, C$_{1-4}$alkyl, C$_{1-4}$alkoxy, COOH, —C$_{1-2}$alkylene—NHR; —O—phenyl or —NH—phenyl, the phenyl group of which is unsubstituted or substituted by one to three methyl groups or by a group —C$_{1-2}$alkylene—NHR; —SO$_2$NHR$_{2x}$', —NHR$_{2x}$' and

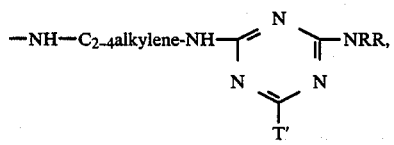

wherein T' is chlorine or —NRR,
R is independently hydrogen or C$_{1-4}$alkyl, and
R$_{2x}$' is hydrogen, C$_{1-2}$alkyl, —CH$_2$CH$_2$OH or —(CH$_2$)$_{2-3}$NRR.

6. A compound according to claim 1, in which each R is R$_a$, where each R$_a$ is independently hydrogen, methyl or ethyl.

7. A compound according to claim 6, in which each R is hydrogen.

8. A compound according to claim 1, in which each R$_1$ is R$_{1b}$, where each R$_{1b}$ is independently —CH$_2$—, —CH$_2$CH$_2$— or

9. A compound according to claim 8, in which each R$_1$ is methylene.

10. A compound according to claim 1, in which each of R$_7$ and R$_8$ is R$_{7b}$ and R$_{8b}$, where each of R$_{7b}$ and R$_{8b}$ is independently C$_{1-4}$alkyl or cyclohexyl or R$_{7b}$ and R$_{8b}$ together with the N-atom to which they are attached form a piperidine or morpholine ring.

11. A compound according to claim 1, in which each Q is Q$_a$, where Q$_a$ is independently chlorine, —NR$_{2a}$R$_{3a}$ or ⊖—NR$_{4a}$R$_{5a}$R$_{6a}$ An⊕,
R$_{2a}$ is C$_{1-6}$alkyl, —C$_{2-4}$alkylene—Y', in which Y' is OH or —NR$_{2b}$'R$_{3b}$', cyclohexyl unsubstituted or substituted by one to three methyl groups; phenyl or phenyl-C$_{1-2}$alkyl, in which the phenyl ring of the latter two groups is unsubstituted or substituted by one or two groups selected from chlorine, methyl and methoxy;

R$_{3a}$ is hydrogen, C$_{1-6}$alkyl, hydroxyethyl or cyclohexyl;
or R$_{2a}$ and R$_{3a}$ together with the N-atom to which they are attached form a pyrrolidine, piperidine, morpholine or piperazine ring, which rings are further unsubstituted or may be substituted by one to three groups selected from methyl, hydroxyethyl and aminoethyl, R$_{2b}$' is hydrogen, C$_{1-4}$alkyl, cyclohexyl or phenyl-C$_{1-2}$alkyl, R$_{3b}$' is hydrogen, C$_{1-4}$alkyl or cyclohexyl,
or R$_{2b}$' and R$_{3b}$' together with the N-atom to which they are attached form a piperidine, morpholine or piperazine ring, in which the N-atom of the latter ring is unsubstituted or substituted by methyl, hydroxyethyl or aminoethyl, R$_{4a}$ has one of the non-cyclic or cyclic significances of R$_{2a}$;

R$_{5a}$ has one of the non-cyclic or cyclic significances of R$_{3a}$ except hydrogen;

R$_{6a}$ is NH$_2$, C$_{1-4}$alkyl, hydroxyethyl or phenyl-C$_{1-2}$alkyl;

or R$_{4a}$, R$_{5a}$ and R$_{6a}$ together with the N-atom to which they are attached form a pyridinium group which is further unsubstituted or substituted by one or two methyl groups,
and An⊕ is a non-chromophoric anion.

12. A compound according to claim 2, which compound corresponds to formula Ib,

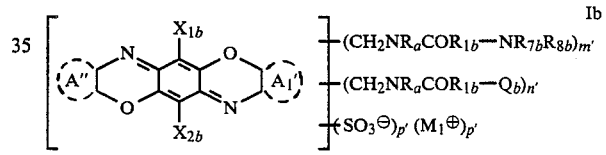

in which
each of the rings A" and A$_1$" is independently a group (a) or (n), in which each position α denotes the carbon atom attached to oxygen and W, respectively, and each position β denotes the carbon atom attached to nitrogen,

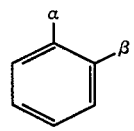
(a)

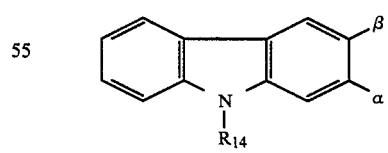
(n)

in which the aromatic rings are further unsubstituted or may be substituted by those groups selected from chlorine, C$_{1-4}$alkyl, C$_{1-4}$alkoxy, COOH, —C$_{1-2}$alkylene—NHR; —O—phenyl or —NH—phenyl, the phenyl group of which is unsubstituted or substituted by one to three methyl groups or by a group —C$_{1-2}$alkylene—NHR; —SO$_2$NHR$_{2x}$', —NHR$_{2x}$' and

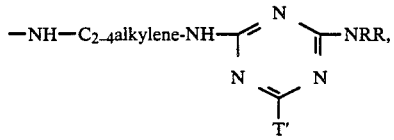

wherein T' is
chlorine or —NRR,
each R is independently hydrogen or $C_{1-4}$alkyl, $R_{2x'}$ is hydrogen, $C_{1-2}$alkyl, —CH$_2$CH$_2$OH or —(CH$_2$)$_{2-3}$NRR, $R_{14}$ is hydrogen, $C_{1-4}$alkyl or —COC$_{1-4}$alkyl;
each of $X_{1b}$ and $X_{2b}$ is chlorine,
each $R_a$ is independently hydrogen, methyl or ethyl,
each $R_{1b}$ is independently —CH$_2$—, —CH$_2$CH$_2$— or

each of $R_{7b}$ and $R_{8b}$ is independently $C_{1-4}$alkyl or cyclohexyl or $R_{7b}$ and $R_{8b}$ together with the N-atom to which they are attached form a piperidine or morpholine ring,
each $Q_b$ is independently chlorine, —NR$_{2b}$R$_{3b}$ or $\ominus$—NR$_{4b}$R$_{5b}$R$_{6b}$ An$\oplus$,
$R_{2b}$ is $C_{1-4}$alkyl, —C$_{2-3}$alkylene—Y″, in which Y″ is OH or
—NRR; cyclohexyl or phenyl-$C_{1-2}$alkyl;
$R_{3b}$ is hydrogen, $C_{1-4}$alkyl or cyclohexyl;
or $R_{2b}$ and $R_{3b}$ together with the N-atom to which they are attached form a piperidine, morpholine or piperazine ring, in which the N-atom of the latter ring is unsubstituted or substituted by methyl, hydroxyethyl or aminoethyl, each of m' and n' is independently a number of from 1 to 3, provided that $2 \leq m' = n' \leq 4$, p' is a number of from 0 to 0.5, and
$M_1\oplus$ is hydrogen, sodium, potassium, lithium, ammonium or substituted ammonium, with the proviso that in a compound of formula Ib $Q_b$ is different from —NR$_{7b}$R$_{8b}$.

13. A compound according to claim 5 of formula Ia

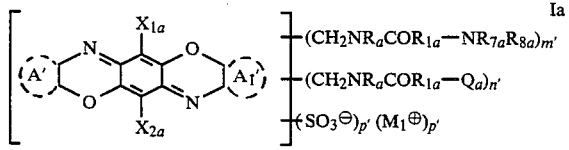

in which
each of the rings A' and A$_1'$ is independently a fused ring system (a) to (o) as defined in claim 5;
each of $X_{1a}$ and $X_{2a}$ is, independently, hydrogen; chlorine; bromine; cyano; methyl; ethyl; methoxy; ethoxy; phenylamino, the phenyl group of which is unsubstituted or substituted by one or two groups selected from chlorine, methyl and methoxy; —NHCOR$_{9a}$; —CONHR$_{10a}$; —COO$_{12a}$ or —O-COR$_{13a}$;

each $Q_a$ is, independently, chlorine, —NR$_{2a}$R$_{3a}$ or $\ominus$—NR$_{4a}$R$_{5a}$R$_{6a}$An$\oplus$;
each $R_a$ is, independently, hydrogen, methyl or ethyl;
each $R_{1a}$ is, independently, $C_{1-4}$alkylene or $C_{2-3}$alkenylene;
$R_{2a}$ is $C_{1-6}$alkyl, —C$_{2-4}$alkylene—Y', in which Y' is OH or —NR$_{2b'}$R$_{3b'}$, cyclohexyl unsubstituted or substituted by one to three methyl groups; phenyl or phenyl-$C_{1-2}$alkyl, in which the phenyl ring of the latter two groups is unsubstituted or substituted by one or two groups selected from chlorine, methyl and methoxy;
$R_{3a}$ is hydrogen, $C_{1-6}$alkyl, hydroxyethyl or cyclohexyl;
or $R_{2a}$ and $R_{3a}$ together with the N-atom to which they are attached form a pyrrolidine, piperidine, morpholine or piperazine ring, which rings are further unsubstituted or may be substituted by one to three groups selected from methyl, hydroxyethyl and aminoethyl;
$R_{4a}$ has one of the non-cyclic or cyclic significances of $R_{2a}$;
$R_{5a}$ has one of the non-cyclic or cyclic significances of $R_{3a}$ except hydrogen;
$R_{6a}$ is NH$_2$, $C_{1-4}$alkyl, hydroxyethyl or phenyl-$C_{1-2}$alkyl;
or $R_{4a}$, $R_{5a}$ and $R_{6a}$ together with the N-atom to which they are attached form a pyridinium group which is further unsubstituted or substituted by one or two methyl groups;
each of $R_{7a}$ and $R_{8a}$ is, independently, $C_{1-6}$alkyl, hydroxyethyl or cyclohexyl which is unsubstituted or substituted by up to three methyl groups,
or $R_{7a}$ and $R_{8a}$ together with the N-atom to which they are attached form a piperidine, morpholine or piperazine ring, in which the N-atom of the piperazine ring is unsubstituted or substituted by methyl, hydroxyethyl or aminoethyl;
$R_{9a}$ is methyl, phenyl or phenyl monosubstituted by chlorine, methyl or methoxy;
$R_{10a}$ is hydrogen, phenyl or phenyl monosubstituted by chlorine, methyl or methoxy;
$R_{12a}$ is hydrogen, methyl or ethyl;
$R_{13a}$ is methyl or ethyl;
$R_{2b'}$ is hydrogen, $C_{1-4}$alkyl, cyclohexyl or phenyl-$C_1$-2alkyl;
$R_{3b'}$ is hydrogen, $C_{1-4}$alkyl or cyclohexyl;
or $R_{2b'}$ or $R_{3b'}$ together with the N-atom to which they are attached form a piperidine, morpholine or piperazine ring, in which the N-atom of the latter ring is unsubstituted or substituted by methyl, hydroxyethyl or aminoethyl;
$\oplus M_1$ is hydrogen, sodium, potassium, lithium, ammonium or substituted ammonium;
each of m' and n' is, independently, a number from 1 to 3, provided that $2 \leq m' = n' \leq 4$; and p' is a number from 0 to 0.5; with the proviso that $Q_a$ is different from —NR$_{7a}$R$_{8a}$.

14. A compound according to claim 13 wherein
$X_{1a}$ is $X_{1b}$ and $X_{2a}$ is $X_{2b}$ where each of $X_{1b}$ and $X_{2b}$, independently, is hydrogen, chlorine, bromine, methyl, ethyl, —NHCOR$_{9a}$, —CONH$_2$ or —COOR$_{12a}$;
$Q_a$ is $Q_b$ where each $Q_b$ is identical and is chlorine, —NR$_{2b}$R$_{3b}$ or $\oplus$—NR$_{4b}$R$_{5b}$R$_{6b}$,
$R_a$ is hydrogen;
$R_{1a}$ is —CH$_2$—;

$R_{2b}$ is $C_{1-4}$alkyl, $C_{2-3}$alkylene-Y''', cyclohexyl or phenyl $C_{1-2}$alkyl and $R_{3b}$ is hydrogen, $C_{1-4}$alkyl or cyclohexyl or $R_{2b}$ and $R_{3b}$ together with the N-atom to which they are attached form a piperidine, morpholine or piperazine ring in which the N-atom of the piperazine ring is unsubstituted or substituted by methyl, hydroxyethyl or aminoethyl;

$R_{4b}$ has one of the non-cyclic or cyclic significances of $R_{2b}$, $R_{5b}$ has one of the non-cyclic or cyclic significances of $R_{3b}$, except hydrogen, and $R_{6b}$ is $C_{1-2}$alkyl or benzyl, or $R_{4b}$, $R_{5b}$ and $R_{6b}$ together with the N-atom to which they are attached form a pyridinium, picolinium or lutidinium group;

$R_{7a}$ is $R_{7c}$ where $R_{7c}$ is methyl or (n) butyl and $R_{8a}$ is $R_{8c}$ where $R_{8c}$ is (n) butyl or cyclohexyl or $R_{7c}$ and $R_{8c}$ together with the N-atom to which they are attached form a piperidine or morpholine ring;

$R_{9a}$ is methyl, phenyl or phenyl monosubstituted by chlorine, methyl or methoxy;

$R_{12a}$ is hydrogen, methyl or ethyl; and

Y'' is —OH or —NRR.

15. A compound according the claim 12 of formula Ic

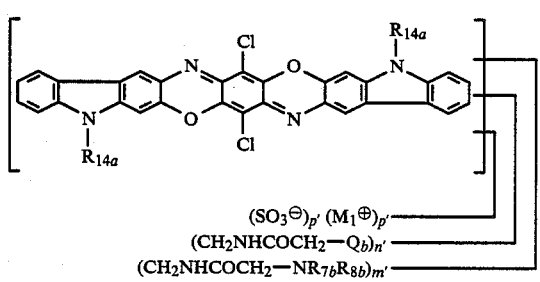

wherein $R_{14a}$ is hydrogen, methyl, ethyl or —COCH$_3$.

16. A compound according to claim 15 of the formula

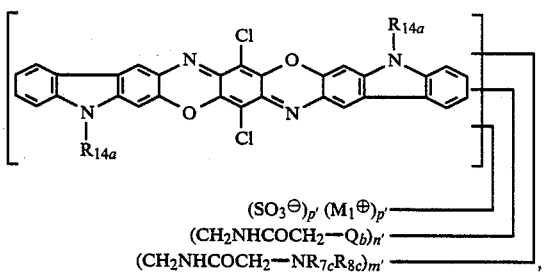

in which $R_{7c}$ is methyl or n-butyl and $R_{8c}$ is n-butyl or cyclohexyl or $R_{7c}$ and $R_{8c}$ together with the N-atom to which they are attached form a piperidine or morpholine ring and each $Q_b$ is identical.

17. A process for the preparation of a compound of formula I defined in claim 1, comprising reacting per mol of a compound of formula II,

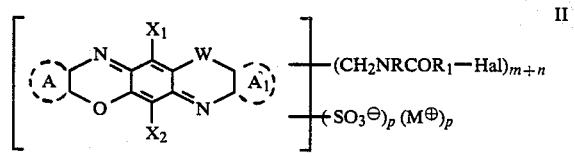

in which A, A$_1$, W, X$_1$, X$_2$, R, R$_1$, M, m, n and p are as defined in claim 1, and Hal is halogen, m mols of a compound of formula III, $$HNR_7R_8 \quad\quad III$$

in which $R_7$ and $R_8$ are as defined in claim 1, and optionally n or $n_1$ mols of a compound of formula IV or V $$HNR_2R_3 \quad\quad IV$$

$$NR_4R_5R_6 \quad\quad V$$

in which $R_2$ to $R_6$ are as defined in claim 1, and $n_1$ is less than n, provided that when n mols of a compound of formula IV are employed, a compound of formula III and a compound of formula IV are different from each other, whereby in a step (a) m=1 mol of a compound of formula III is reacted at a maximum temperature of 40° C. and in an alkaline pH range below 11;

and, if necessary, in a subsequent step (b) m-1 mols of a compound of formula III and optionally n or $n_1$ mols of a compound of formula IV or V are reacted in an alkaline pH range of approximately pH 11 and in a temperature range of from 45°–80° C.

18. A process according to claim 17 wherein the reaction according to step (a) is effected in water at a temperature of between 20° and 40° C. and a pH of 9.5 to 10.7.

19. A process according to claim 17 wherein the reaction according to step (a) is effected in water at a temperature of 32°–40° C. and a pH of 10.4–10.7.

20. A process according to claim 18 wherein the reaction according to step (b) is carried out in water at a temperature of 45°–80° C. and a pH of 10.7–11.2.

21. A process according to claim 19 wherein the reaction according to step (b) is carried out in water at a temperature of 48°–60° C. and a pH of 10.7–11.2.

* * * * *